US012251808B2

(12) United States Patent
Liu et al.

(10) Patent No.: US 12,251,808 B2
(45) Date of Patent: Mar. 18, 2025

(54) ELECTRIC NAIL GUN

(71) Applicant: BASSO INDUSTRY CORP., Taichung (TW)

(72) Inventors: An-Gi Liu, Taichung (TW); Chang-Sheng Lin, Taichung (TW); Guey-Horng Liou, Taichung (TW)

(73) Assignee: Basso Industry Corp., Taichung (TW)

( * ) Notice: Subject to any disclaimer, the term of this patent is extended or adjusted under 35 U.S.C. 154(b) by 0 days.

(21) Appl. No.: 18/498,392

(22) Filed: Oct. 31, 2023

(65) Prior Publication Data

US 2024/0139924 A1 May 2, 2024

(30) Foreign Application Priority Data

Nov. 2, 2022 (TW) ................................. 111141845

(51) Int. Cl.
*B25C 1/06* (2006.01)

(52) U.S. Cl.
CPC ..................................... *B25C 1/06* (2013.01)

(58) Field of Classification Search
CPC ........... B25C 1/06; B25C 1/003; B25C 1/008; B25C 5/15; B25C 7/00; B25C 1/00; B25C 1/188; B25C 5/06
See application file for complete search history.

(56) References Cited

U.S. PATENT DOCUMENTS 3,299,967 A * 1/1967 Cabot ...................... B25C 1/06 173/31

FOREIGN PATENT DOCUMENTS

CN 102844154 A 12/2012

* cited by examiner

*Primary Examiner* — Veronica Martin
(74) *Attorney, Agent, or Firm* — Burris Law, PLLC

(57) ABSTRACT

An electric nail gun includes a main body unit, a hammer unit, and a motor unit. The hammer unit includes a hammer member that is adapted for striking a nail, and a resilient member that has two opposite ends respectively abutting against the hammer member and the main body unit. The resilient member of the hammer unit constantly provides a hammer restoring force for the hammer member to move in a striking direction for striking the nail. The motor unit is mounted to the main body unit, and includes a lifting wheel. The lifting wheel has at least one pushing portion that separably engages the hammer member, and that is operable to push the hammer member to move in an energy storage direction opposite to the striking direction such that the resilient member of the hammer unit is compressed and provides the hammer restoring force to the hammer member.

12 Claims, 11 Drawing Sheets

ELECTRIC NAIL GUN

CROSS-REFERENCE TO RELATED APPLICATION

This application claims priority to Taiwanese Invention Patent Application No. 111141845, filed on Nov. 2, 2022, and incorporated by reference herein in its entirety.

FIELD

The disclosure relates to an electric nail gun, and more particularly to an electric nail gun for providing repeated hammer blows.

BACKGROUND

Referring to FIG. 1, a conventional percussion device 1 disclosed in Chinese Patent Publication No. 102844154 includes a housing 11, a sleeve 12, an impact member 13, a hammer 14, and a helical gear 15. The sleeve 12 is movable relative to the housing 11. The impact member 13 is movably disposed in the sleeve 12 and is adapted for striking a nail (not shown). The hammer 14 is disposed in the housing 11, is rotatable about an axis (not shown), and is operable to strike the impact member 13. The helical gear 15 is driven by a motor (not shown) to rotate about the axis, and releasably engages the hammer 14. The hammer 14 is urged by the helical gear 15 to rotate about the axis when the hammer 14 engages the helical gear 15, and has two protruding portions 141 that are spaced apart from each other.

When the helical gear 15 urges the hammer 14 to rotate to a position in which one of the protruding portions 141 of the hammer 14 strikes the impact member 13, the hammer 14 is refrained from rotating with the helical gear 15. At this time, the helical gear 15 continues to rotate, and the hammer 14 is released from the helical gear 15 such that the hammer 14 moves along an outer peripheral surface of the helical gear 15 in a direction of the axis and compresses a resilient member (not shown). When the hammer 14 moves in the direction of the axis to a position in which the one of the protruding portions 141 of the hammer 14 is separated from the impact member 13, the hammer 14 engages the helical gear 15 again so that the hammer 14 is urged by the helical gear 15 to rotate. At this time, the compressed resilient member is restored to its original shape, accelerates the rotation of the hammer 14 and the helical gear 15, and urges the hammer 14 to move in a direction opposite to the direction of the axis so that when the helical gear 15 urges the hammer 14 to rotate, the other one of the protruding portions 141 of the hammer 14 strikes the impact member 13. When any one of the protruding portions 141 of the hammer 14 strikes the impact member 13, the impact member 13 hammers the nail such that the nail is driven into an object (not shown). Therefore, when the impact member 13 is alternately struck by the protruding portions 141 of the hammer 14, the conventional percussion device 1 may provide repeated hammering blows to repeatedly hammer the nail. The sleeve 12 is gradually retracted into the housing 11 as the nail is gradually hammered deeply into the object so that the impact member 13 may be kept close to the nail.

However, the energy stored in the resilient member when the resilient member is compressed by the hammer 14 is used not only for accelerating the rotation of the hammer 14 and the helical gear 15, but also for driving linear movement of the hammer 14 in the direction opposite to the direction of the axis. That is to say, the energy provided by the resilient member has to be transferred to the nail through the hammer 14 and the helical gear 15 (i.e., the energy is not directly transferred to the nail). Thus, the energy transmission path may be relatively long, and a large amount of the energy may be lost before the energy is transferred to the nail.

Furthermore, because the nail is hidden in the sleeve 12, the conventional percussion device 1 may not be able to stop striking the nail when the nail has been driven into the object deeply. A user has to determine when to stop operating the conventional percussion device 1 by observing the length of the sleeve 12. The conventional percussion device 1 is therefore not user-friendly.

SUMMARY

Therefore, an object of the disclosure is to provide an electric nail gun that can alleviate at least one of the drawbacks of the prior art.

According to the disclosure, the electric nail gun includes a main body unit, a muzzle unit, a hammer unit, a motor unit, and a control unit. The main body unit defines an energy storage space and a passage that is in spatial communication with the energy storage space. The muzzle unit includes a muzzle that defines a nail-accommodating space, and a resilient member that is disposed in the passage, and that has two opposite ends respectively abutting against the muzzle and the main body unit. The nail-accommodating space is adapted for accommodating a nail. The muzzle extends into the passage, and is movable relative to the main body unit between an activation position, in which the muzzle is distal from the energy storage space, and a cessation position, in which the muzzle is proximate to the energy storage space. The resilient member constantly provides a muzzle restoring force for the muzzle to move away from the cessation position. The hammer unit includes a hammer member and a resilient member. The hammer member extends from the energy storage space through the passage into the nail-accommodating space, is movable relative to the energy storage space, the passage, and the nail-accommodating space, and is adapted for striking the nail. The resilient member of the hammer unit has two opposite ends that respectively abut against the hammer member and the main body unit. The resilient member of the hammer unit constantly provides a hammer restoring force for the hammer member to move in a striking direction for striking the nail. The motor unit is mounted to the main body unit, and includes a lifting wheel and a motor module. The lifting wheel is rotatable about a rotation axis. The motor module is operable to urge the lifting wheel to rotate. The rotation axis is substantially orthogonal to the striking direction. The lifting wheel has at least one pushing portion that separably engages the hammer member, and that is operable to push the hammer member to move in an energy storage direction opposite to the striking direction such that the resilient member of the hammer unit is compressed and provides the hammer restoring force to the hammer member. The control unit includes a trigger subunit that is mounted to the main body unit, a sensing subunit that is mounted to the main body unit and the muzzle, and a control subunit that is signally coupled to the motor module, the sensing subunit and the trigger subunit. The trigger subunit generates a trigger signal when being operated. The sensing subunit generates an activation signal when the muzzle is in the activation position. The control subunit activates the motor module when receiving the trigger signal and the activation signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
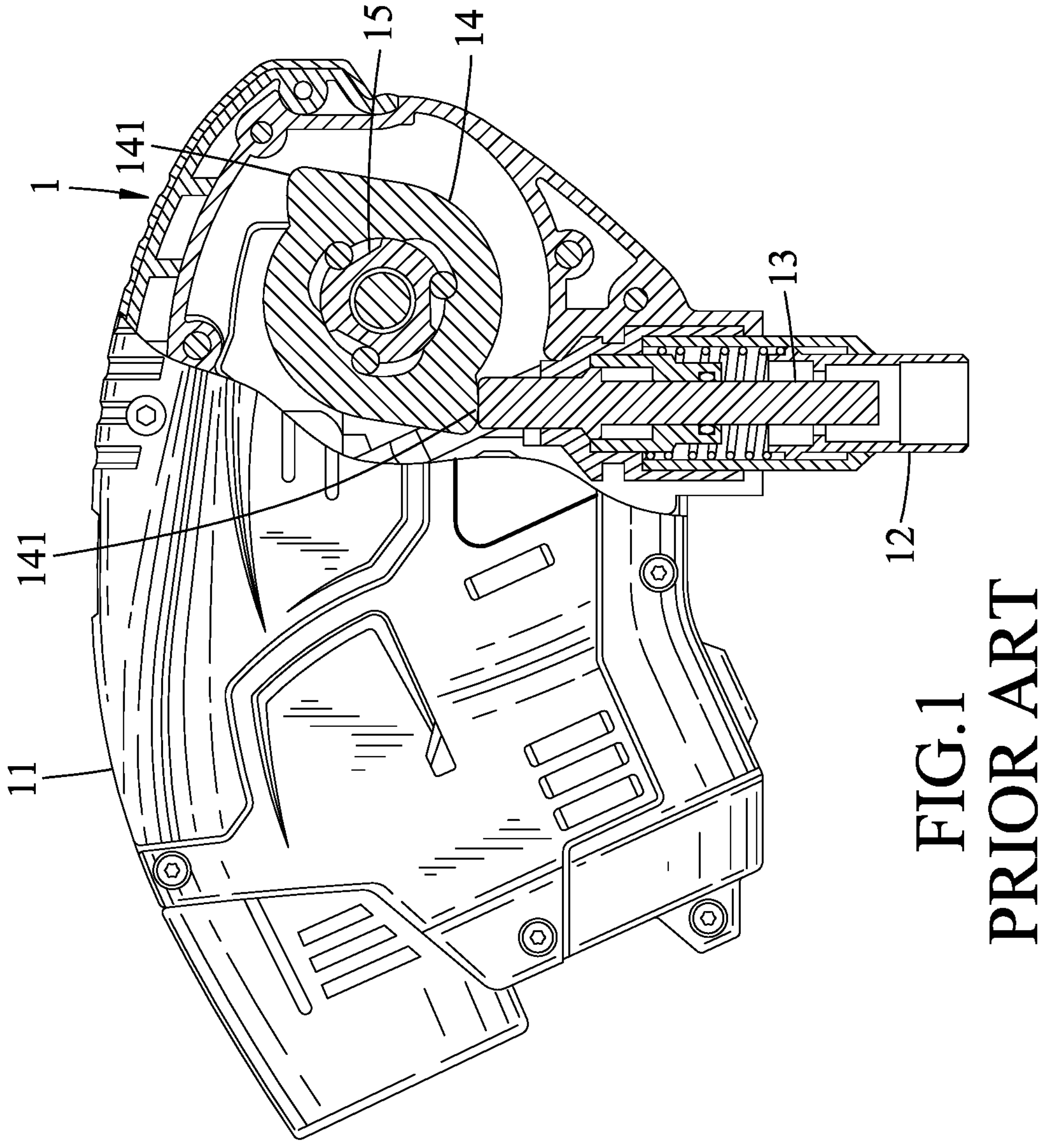
FIG.1 PRIOR ART
FIG. 1 is a fragmentary sectional view of a conventional percussion device disclosed in Chinese Patent Publication No. 102844154.
Figure 2:
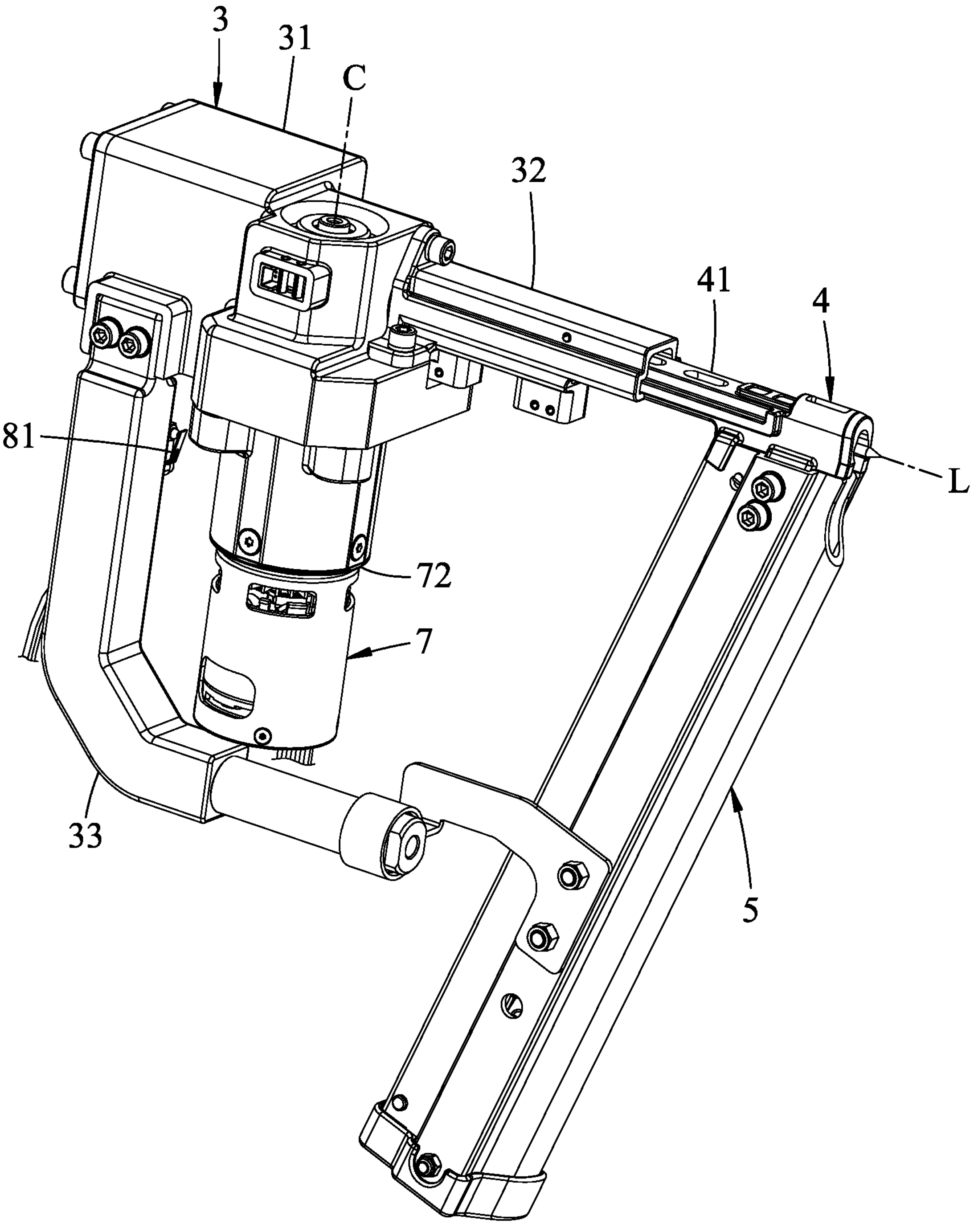
FIG. 2 is a fragmentary perspective view of an embodiment of an electric nail gun according to the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 2 to 5, an embodiment of an electric nail gun according to the disclosure is adapted for striking a nail 21. The electric nail gun includes a main body unit 3, a muzzle unit 4, a magazine unit 5, a hammer unit 6, a motor unit 7, and a control unit 8.

It is noted that, the electric nail gun further includes a housing that covers the main body unit 3 and the motor unit 7. However, in order to present technical features of the electric nail gun more clearly, the housing is not shown in the drawings of the disclosure.

The main body unit 3 includes a main body 31, a sleeve 32 that is connected to the main body 31 and that is elongated along a main axis (L), and a grip 33 that is connected to the main body 31 and that is substantially L-shaped. The main body 31 has an inner surface 311 that defines an energy storage space 310. The sleeve 32 surrounds the main axis (L) to define a passage 320 that is in spatial communication with the energy storage space 310.

The muzzle unit 4 includes a muzzle 41 that is disposed on the sleeve 32 and that is movable relative to the sleeve 32, and a resilient member 42 that is disposed in the passage 320.

The muzzle 41 extends into the passage 320, is movable relative to the passage 320 along the main axis (L), and surrounds the main axis (L) to define a nail-accommodating space 410 that is in spatial communication with the passage 320. The muzzle 41 has a nail outlet 411 that is spaced apart from the passage 320 and that is formed at one end thereof, and a nail inlet 412 that is in spatial communication with the nail-accommodating space 410 and that is located between the nail outlet 411 and the sleeve 32 along the main axis (L).

Referring to FIG. 5 again, the nail inlet 412 is adapted for the nail 21 to enter the nail-accommodating space 410 therethrough. The nail-accommodating space 410 is adapted for accommodating the nail 21. The nail outlet 411 is adapted for allowing the nail 21 to exit the nail-accommodating space 410.

The resilient member 42 is a compression spring, and has two opposite ends that respectively abut against the muzzle 41 and the sleeve 32 of the main body unit 3.

The magazine unit 5 is co-movably connected to the muzzle 41 such that the magazine unit 5 is movable relative to the main body unit 3 along the main axis (L). The magazine unit 5 is adapted for conveying the nail 21 through the nail inlet 412 into the nail-accommodating space 410.

Referring back to FIGS. 2 to 4, the hammer unit 6 is disposed on the main body unit 3 and the muzzle unit 4, and includes a hammer member 61 and a resilient member 62. The hammer member 61 is movable along the main axis (L), and is adapted for striking the nail 21.

The hammer member 61 extends from the energy storage space 310 through the passage 320 into the nail-accommodating space 410, and is movable relative to the energy storage space 310, the passage 320, and the nail-accommodating space 410 along the main axis (L). The hammer member 61 includes a sliding seat 611 and a firing pin 612. The sliding seat 611 is disposed in the energy storage space 310, is slidable on the inner surface 311 of the main body 31, and abuts against the resilient member 62 of the hammer unit 6. The firing pin 612 is connected to the sliding seat 611, extends through the passage 320 into the nail-accommodating space 410, and is adapted for striking the nail 21 in the nail-accommodating space 410. The firing pin 612 has an abutting portion 613 that is formed on one side thereof, and that is located in the main body 31.

The resilient member 62 has two opposite ends that respectively abut against the sliding seat 611 of the hammer member 61 and the main body 31. The resilient member 62 constantly provides a hammer restoring force for the hammer member 61 to move in a striking direction (X1) for striking the nail 21.

The motor unit 7 is mounted to the main body unit 3, and includes a lifting wheel 71 and a motor module 72. The lifting wheel 71 is mounted to the main body 31, and is rotatable about a rotation axis (C). The motor module 72 is mounted to the main body 31, and is operable to urge the lifting wheel 71 to rotate. The rotation axis (C) is substantially orthogonal to the striking direction (X1).

The lifting wheel 71 has four pushing portions 711 that are equiangularly spaced apart from each other about the rotation axis (C), and that are adjacent to an outer circumferential surface of the lifting wheel 71. The abutting portion 613 of the hammer member 61 separably engages one of the pushing portions 711 of the lifting wheel 71 at one time. Each of the pushing portions 711, when engaging the abutting portion 613 of the hammer member 61, is operable to push the hammer member 61 to move in an energy storage direction (X2) opposite to the striking direction (X1) such that the resilient member 62 of the hammer unit 6 is compressed by the hammer member 61 and provides the hammer restoring force to the hammer member 61.

The control unit 8 includes a trigger subunit 81, a sensing subunit 82, a control subunit 83, and a battery subunit 84. The trigger subunit 81 is mounted to the grip 33, and is operable by a user when the user holds the grip 33. The sensing subunit 82 is mounted to the main body unit 3 and the muzzle 41. The control subunit 83 is signally coupled to the trigger subunit 81, the sensing subunit 82, and the motor module 72. The battery subunit 84 provides electric energy for the motor module 72 and the control subunit 83.

In this embodiment, the sensing subunit 82 includes a target member 821 and two sensing members 822.

The target member 821 is a magnetic component, and is co-movably disposed on another end of the muzzle 41 that faces the energy storage space 310 and that is opposite to the one end of the muzzle 41 at which the nail outlet 411 is formed. The sensing members 822 are disposed on the sleeve 32 and are spaced apart from each other along the main axis (L).

Figure 3:
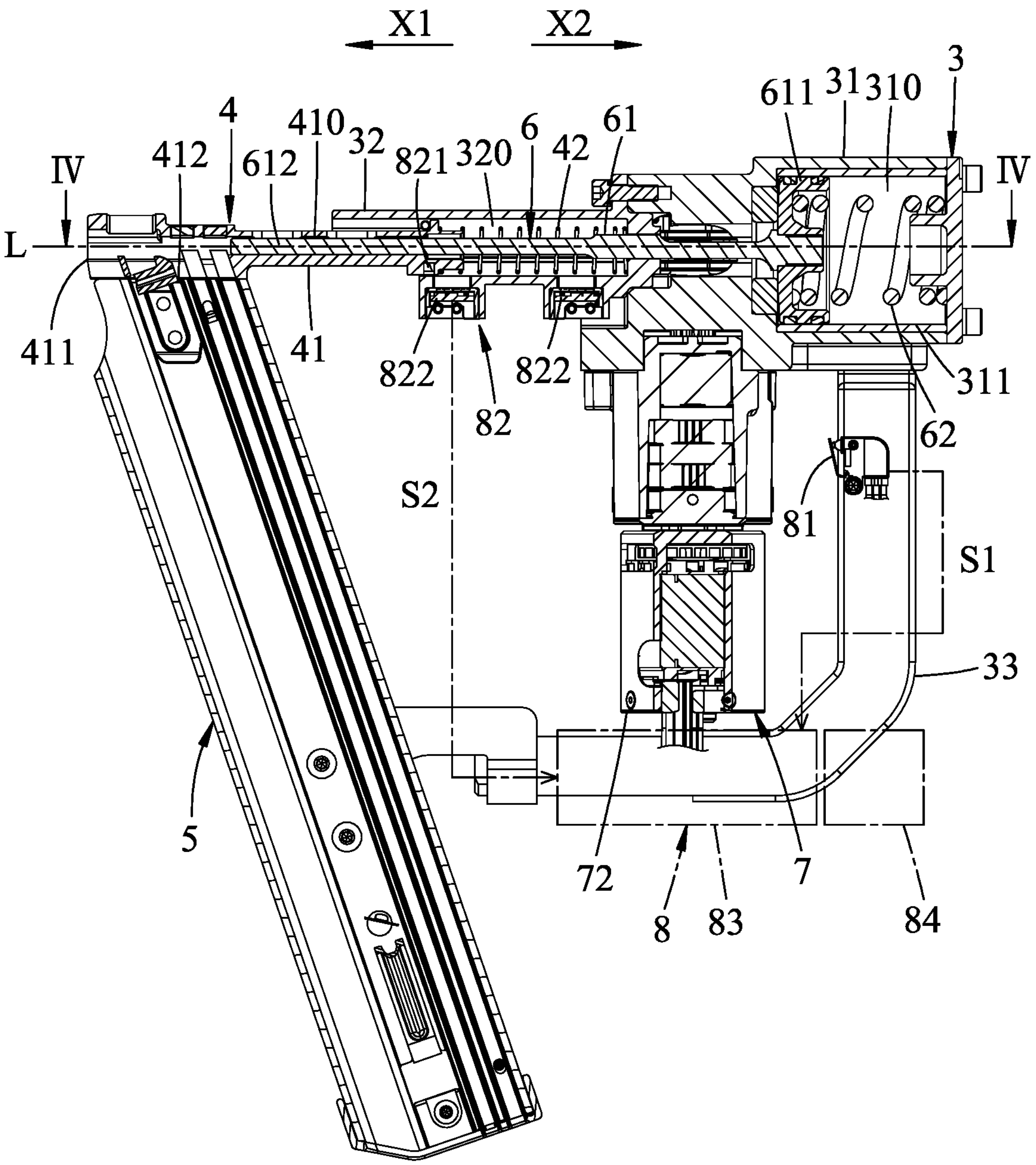
FIG. 3 is a fragmentary sectional view illustrating a muzzle of the embodiment in a standby position.
Figure 4:
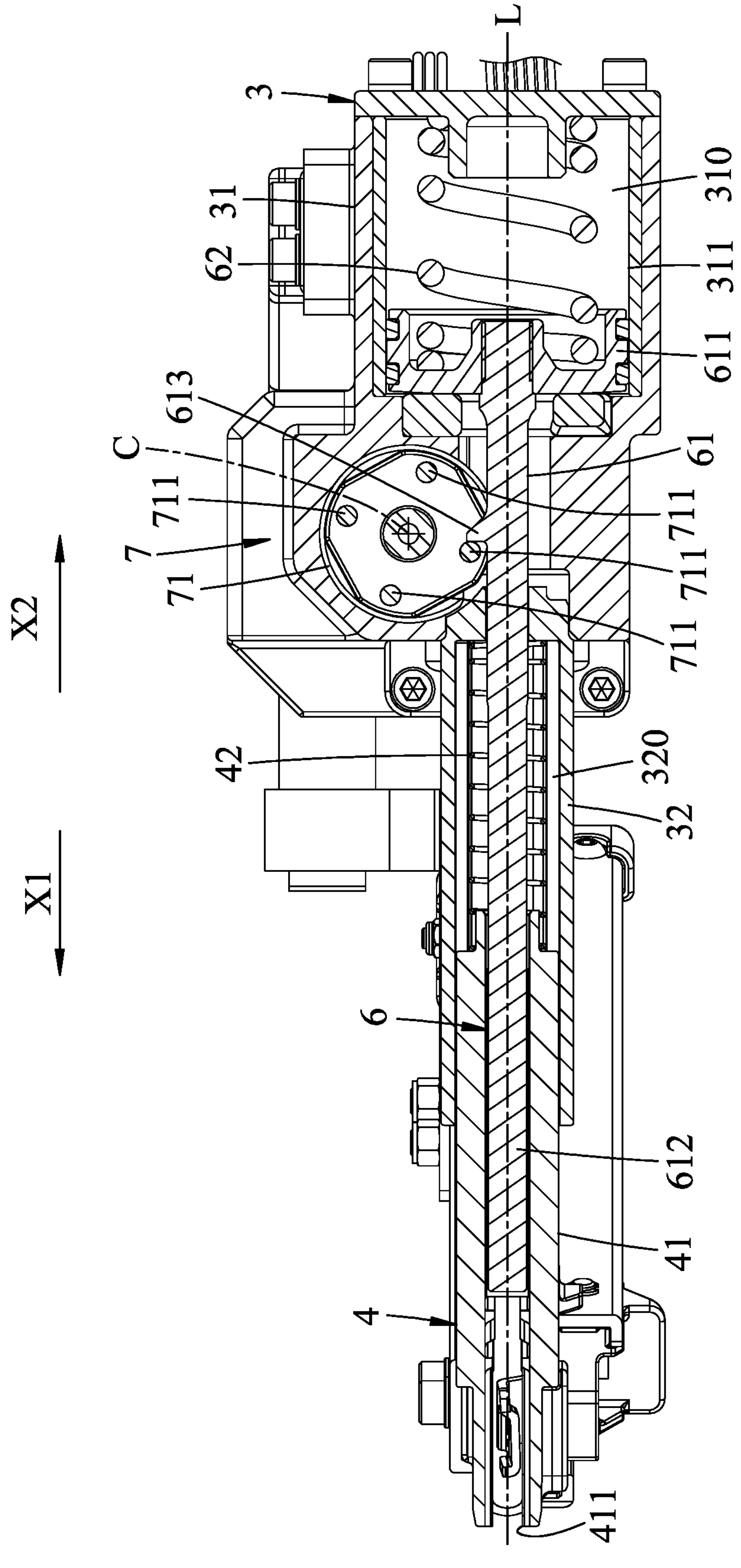
FIG. 4 is a fragmentary sectional view taken along line IV-IV in FIG. 3.
Figure 5:
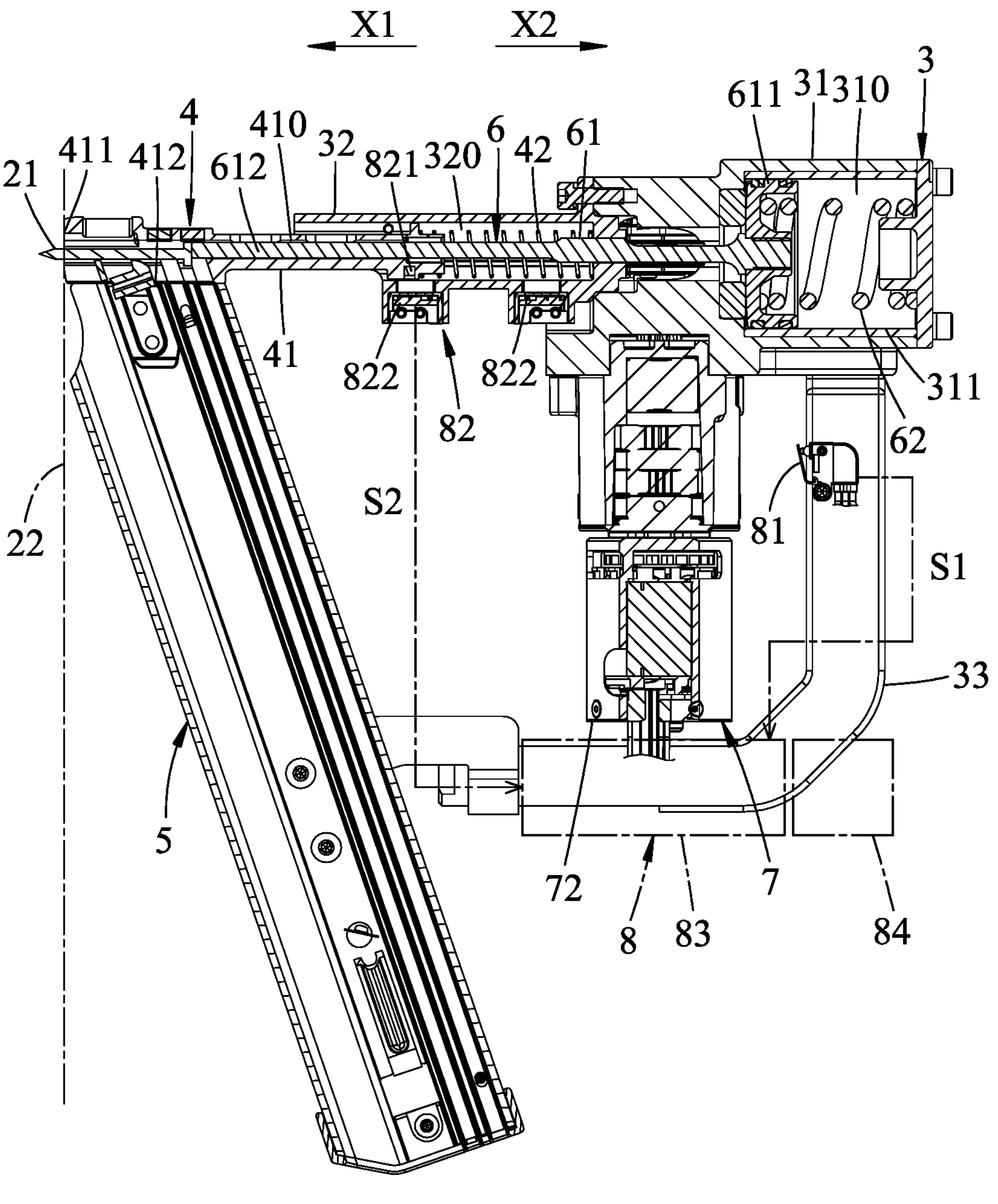
FIG. 5 is a view similar to FIG. 3, but illustrating the muzzle abutting against an object and in an activation position.
Figure 9:
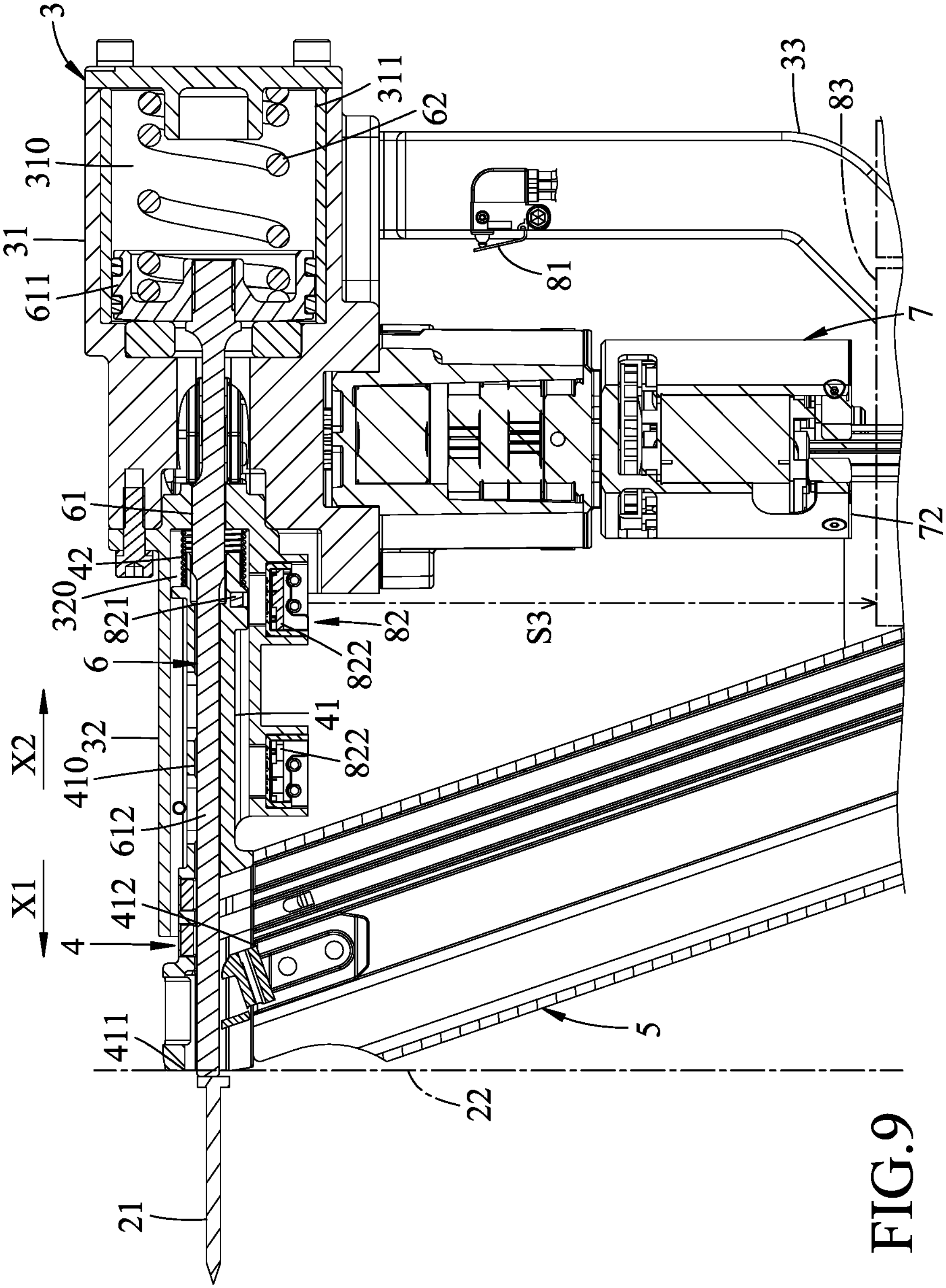
FIG. 9 is a view similar to FIG. 5, but illustrating the muzzle in a cessation position.

Referring further to FIG. 9, in cooperation with FIGS. 3 and 5, the muzzle 41 is movable relative to the sleeve 32 among a standby position (see FIG. 3), an activation position (see FIG. 5), and a cessation position (see FIG. 9) along the main axis (L).

Referring to FIGS. 3 and 4 again, when the muzzle 41 is in the standby position, a distance between the nail outlet 411 and the energy storage space 310 is at the longest, and the target member 821 is located at one side of the sensing members 822 opposite to the energy storage space 310 in the striking direction (X1), and is not located in a sensing area of any one of the sensing members 822. In addition, at this time, the sliding seat 611 is located at its bottom dead center in the energy storage space 310, and the abutting portion 613 of the firing pin 612 engages one of the pushing portions 711 of the lifting wheel 71.

Referring to FIG. 5 again, when the muzzle 41 is in the activation position, the muzzle 41 is pushed in the energy storage direction (X2) and compresses the resilient member 42 such that the resilient member 42 provides a muzzle restoring force for the muzzle 41 to move in the striking direction (X1) to the standby position. Moreover, when the muzzle 41 is in the activation position, a distance between the nail outlet 411 and the energy storage space 310 is shorter than the distance between the nail outlet 411 and the energy storage space 310 when the muzzle 41 in the standby position (i.e., the muzzle 41 approaches the energy storage space 310 when moving from the standby position to the activation position along the main axis (L)). The target member 821 is co-movably disposed on the muzzle 41; thus, when the muzzle 41 is in the activation position, the target member 821 is located in the sensing area of one of the sensing members 822 (hereinafter "the left-side sensing member 822") that is distal from the energy storage space 310.

Referring to FIG. 9 again, the muzzle 41 will be in the cessation position when being pushed in the energy storage direction (X2) from the activation position. When the muzzle 41 is in the cessation position, a distance between the nail outlet 411 and the energy storage space 310 is shorter than the distance between the nail outlet 411 and the energy storage space 310 when the muzzle 41 in the activation position. That is to say, the muzzle 41 is distal from the energy storage space 310 when in the activation position, and is proximate to the energy storage space 310 when in the cessation position. The resilient member 42 constantly provides the muzzle restoring force for the muzzle 41 to move away from the cessation position to the standby position. Furthermore, when the muzzle 41 is in the cessation position, the target member 821 is located in the sensing area of another one of the sensing members 822 (hereinafter "the right-side sensing member 822") that is proximate to the energy storage space 310.

Referring back to FIGS. 3 and 5, when the electric nail gun is not operated, the muzzle 41 is in the standby position (see FIG. 3). When a user wants to strike a nail into an object 22 via the electric nail gun, the user has to operate the trigger subunit 81. The trigger subunit 81 generates a trigger signal (S1) when being operated. Then, the user places the muzzle 41 so that the muzzle 41 abuts against the object 22, and exerts a force on the object 22 so that the muzzle 41 is pushed in the energy storage direction (X2) from the standby position to the activation position (see FIG. 5) by the object 22. At this time, the target member 821 is moved into the sensing area of the left-side sensing member 822, and the left-side sensing member 822 senses the target member 821 and generates an activation signal (S2) accordingly (i.e., the left-side sensing member 822 generates the activation signal (S2) when the muzzle 41 is in the activation position). The control subunit 83 activates the motor module 72 when receiving the trigger signal (S1) generated by the trigger subunit 81 and the activation signal (S2) generated by the left-side sensing member 822.

Figure 6:
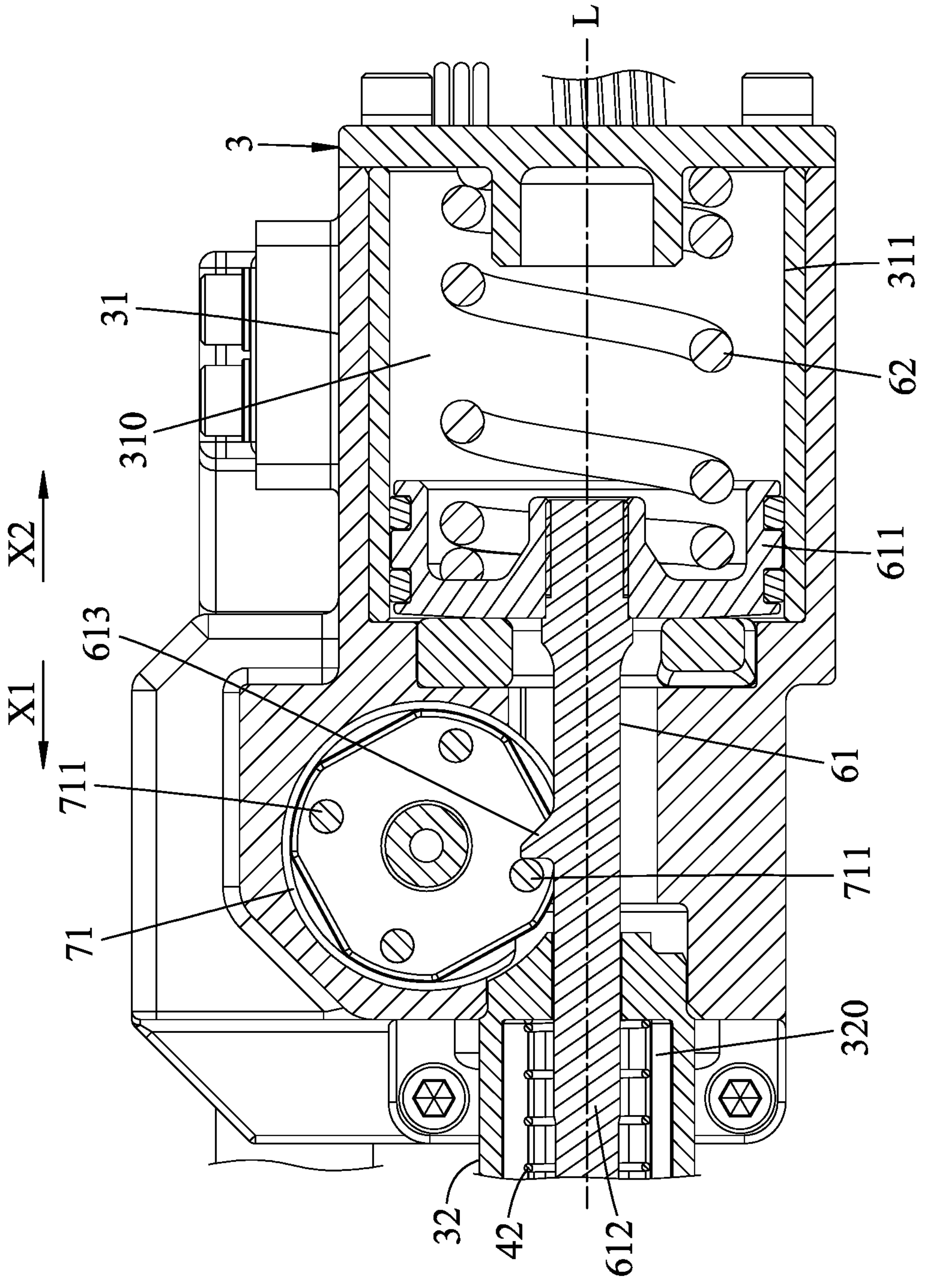
FIG. 6 is a fragmentary, enlarged view of FIG. 4, illustrating a lifting wheel of the embodiment engaging a hammer member of the embodiment.
Figure 7:
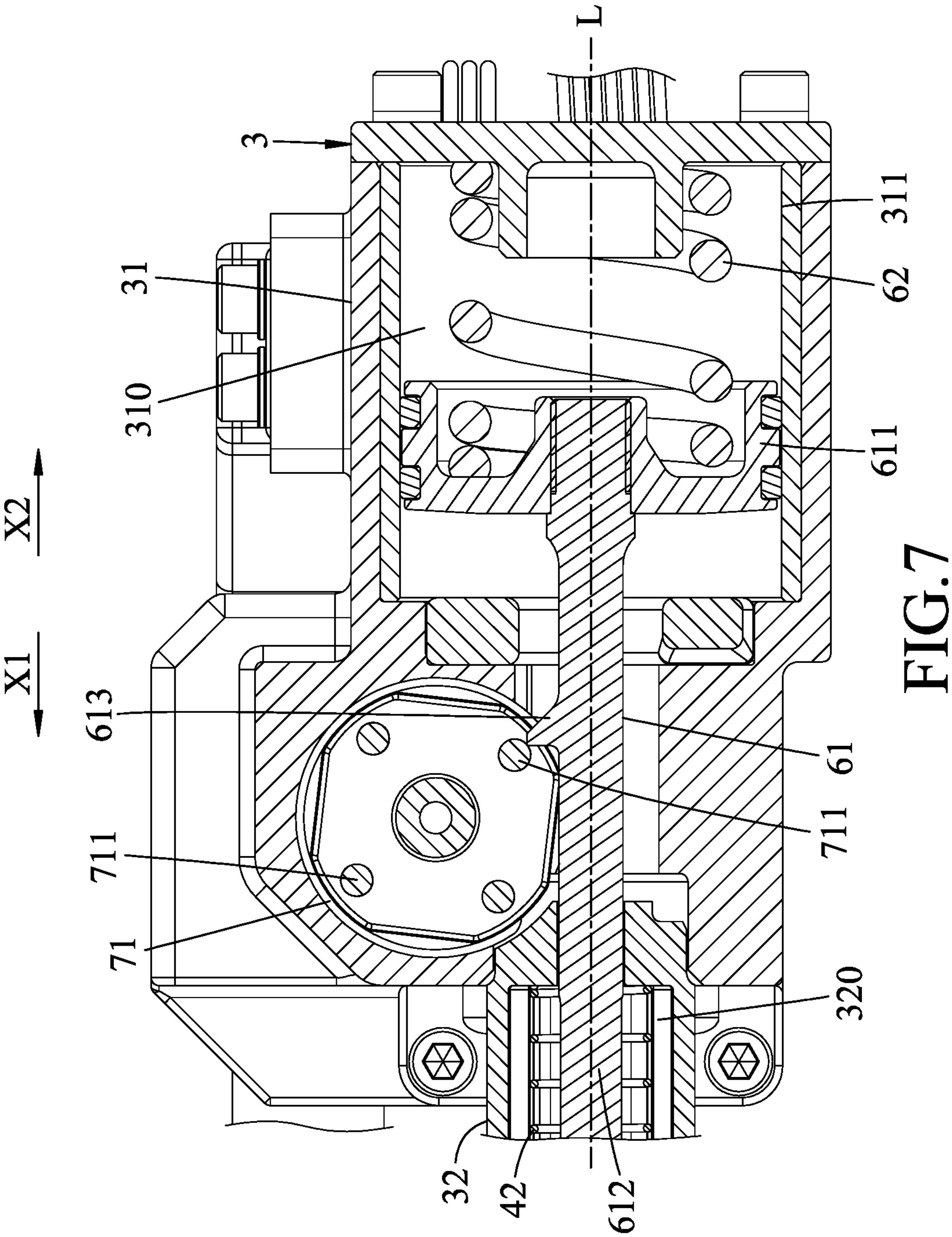
FIG. 7 is a view similar to FIG. 6, but illustrating that the lifting wheel is about to be disengaged from the hammer member.
Figure 8:
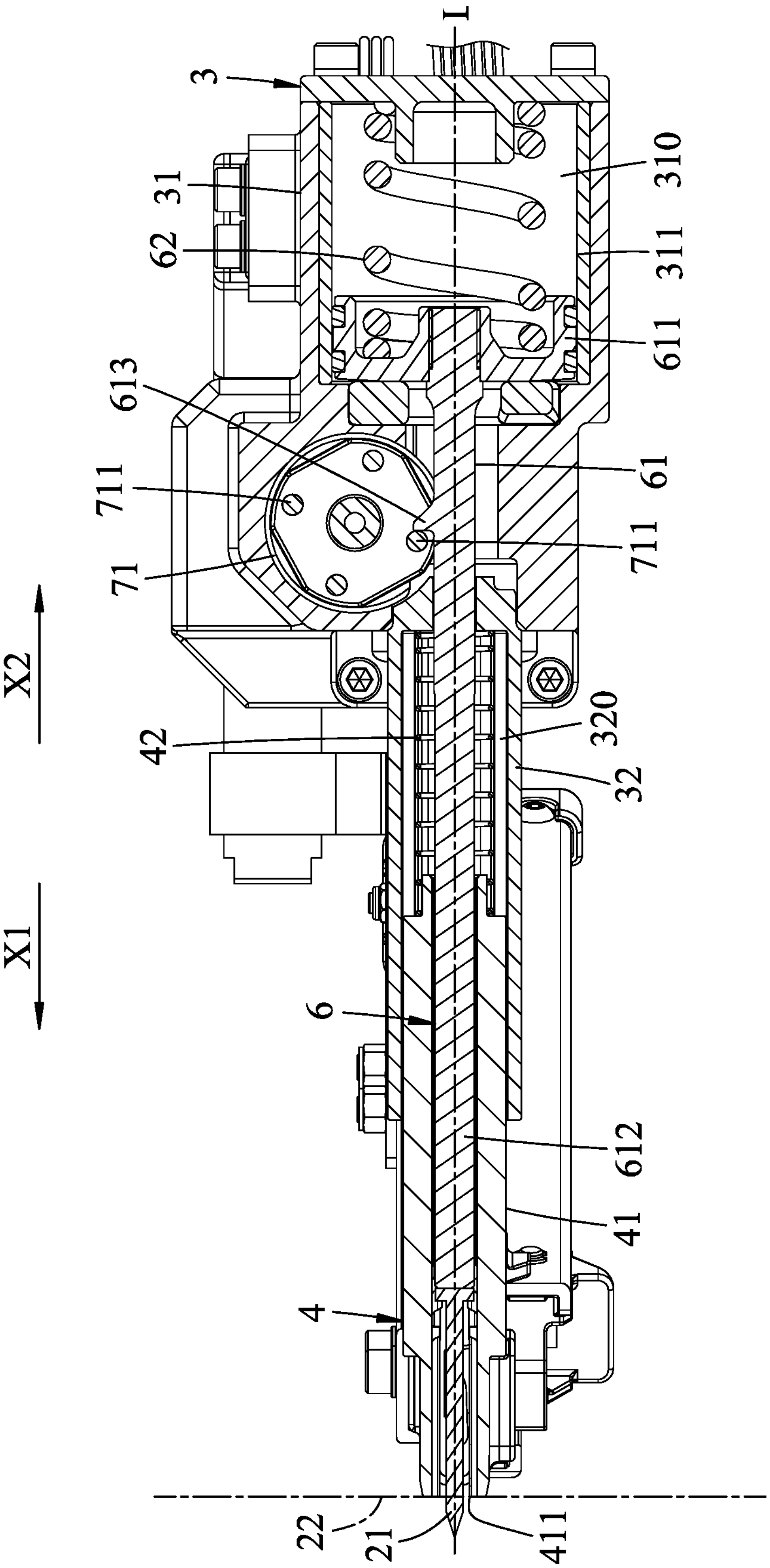
FIG. 8 is a view similar to FIG. 4, but illustrating the hammer member striking a nail.

Referring further to FIGS. 6 to 8, when the motor module 72 is activated, the motor module 72 urges the lifting wheel 71 to rotate in a counterclockwise direction (viewing from FIGS. 6 to 8) via the electric energy from the battery subunit 84. When the lifting wheel 71 rotates, the abutting portion 613 of the firing pin 612 is pushed by the one of the pushing portions 711 that the abutting portion 613 engages to move in the energy storage direction (X2), thereby urging the sliding seat 611 to slide on the inner surface 311 in the energy storage direction (X2) to its top dead center in the energy storage space 310 (see FIG. 7). At this time, the resilient member 62 is compressed by the sliding seat 611 and provides the hammer restoring force to the hammer member 61.

As the lifting wheel 71 continues to rotate in the counterclockwise direction, the one of the pushing portions 711 that the abutting portion 613 engages will be separated from the abutting portion 613, and then another one of the pushing portions 711 will engage the abutting portion 613. During the time when the abutting portion 613 is not in contact with any one of the pushing portions 711, the resilient member 62 returns from being compressed such that the sliding seat 611 is urged to move toward its bottom dead center in the striking direction (X1) by the hammer restoring force provided by the resilient member 62, and the sliding seat 611 urges the firing pin 612 to move in the striking direction (X1) so that the firing pin 612 strikes the nail 21 and urges the nail 21 to exit the nail-accommodating space 410 through the nail outlet 411. Thus, the nail 21 is hammered into the object 22 in the striking direction (X1).

When the lifting wheel 71 rotates continuously, the pushing portions 711 take turns pushing the hammer member 61 in the energy storage direction (X2) to compress the resilient member 62 so that the resilient member 62 repeatedly urges the hammer member 61 to move in the striking direction (X1) via the hammer restoring force to strike the nail 21. Therefore, the electric nail gun may repeatedly strike the nail 21.

Figure 10:
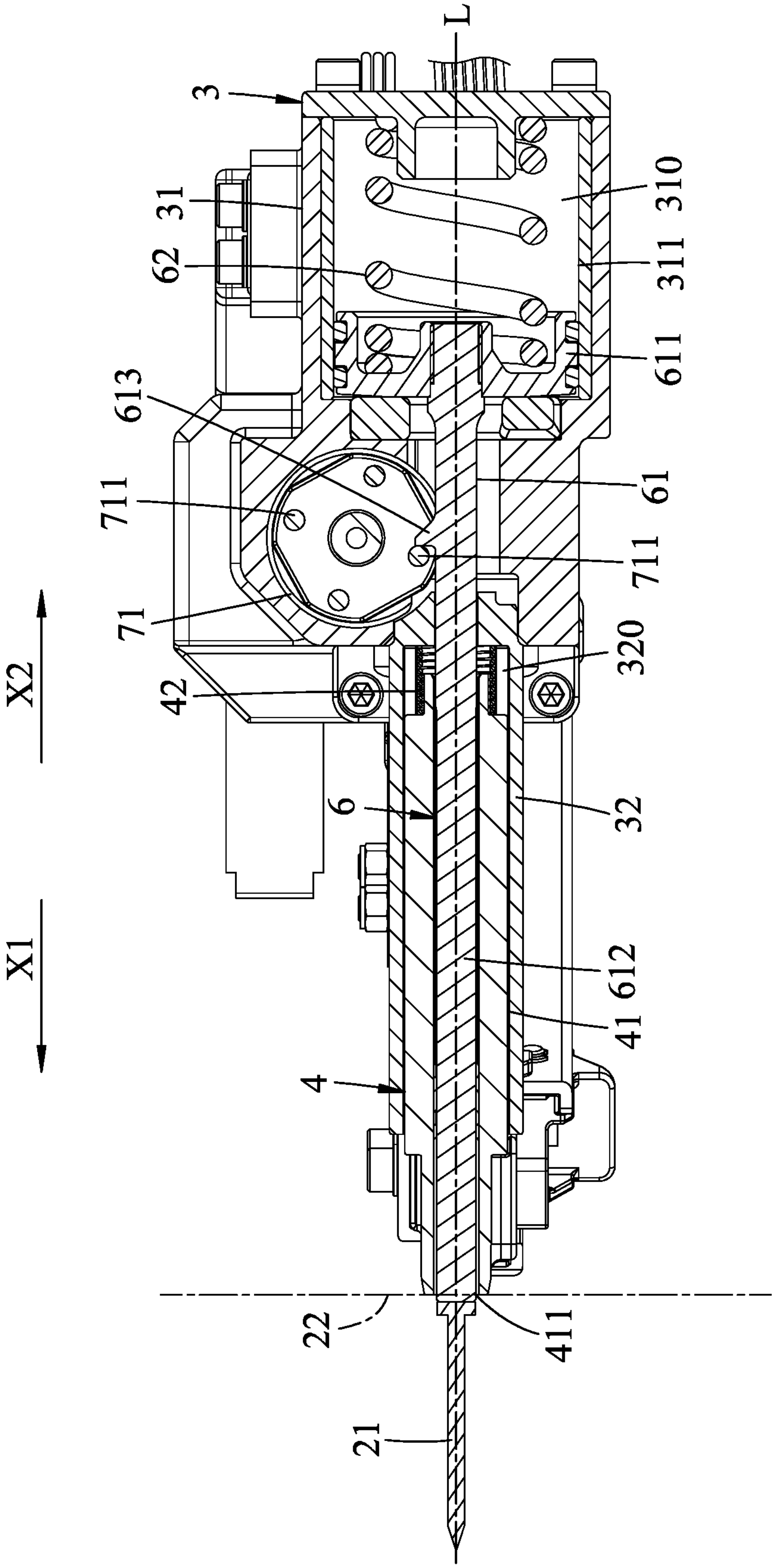
FIG. 10 is a view similar to FIG. 8, but illustrating the nail being hammered into the object.

Referring further to FIG. 10, in cooperation with FIG. 9, it is noted that the more times the electric nail gun strikes the nail 21, the deeper the nail 21 penetrates the object 22 and the less the nail 21 is exposed from the object 22. Therefore, the length of the nail 21 outside the object 22 gets shorter as the electric nail gun continuously strikes the nail 21. When the length of the nail 21 outside the object 22 gets shorter, the muzzle 41 is moved in the energy storage direction (X2) so that the muzzle 41 is gradually retracted into the sleeve 32. Then, when the muzzle 41 is moved to the cessation position, the target member 821 is moved into the sensing area of the right-side sensing member 822, and the right-side sensing member 822 senses the target member 821 and generates a stop signal (S3) accordingly (i.e., the right-side sensing member 822 generates the stop signal (S3) when the muzzle 41 is in the cessation position). The control subunit 83 turns the motor module 72 off when receiving the stop signal (S3).

Figure 11:
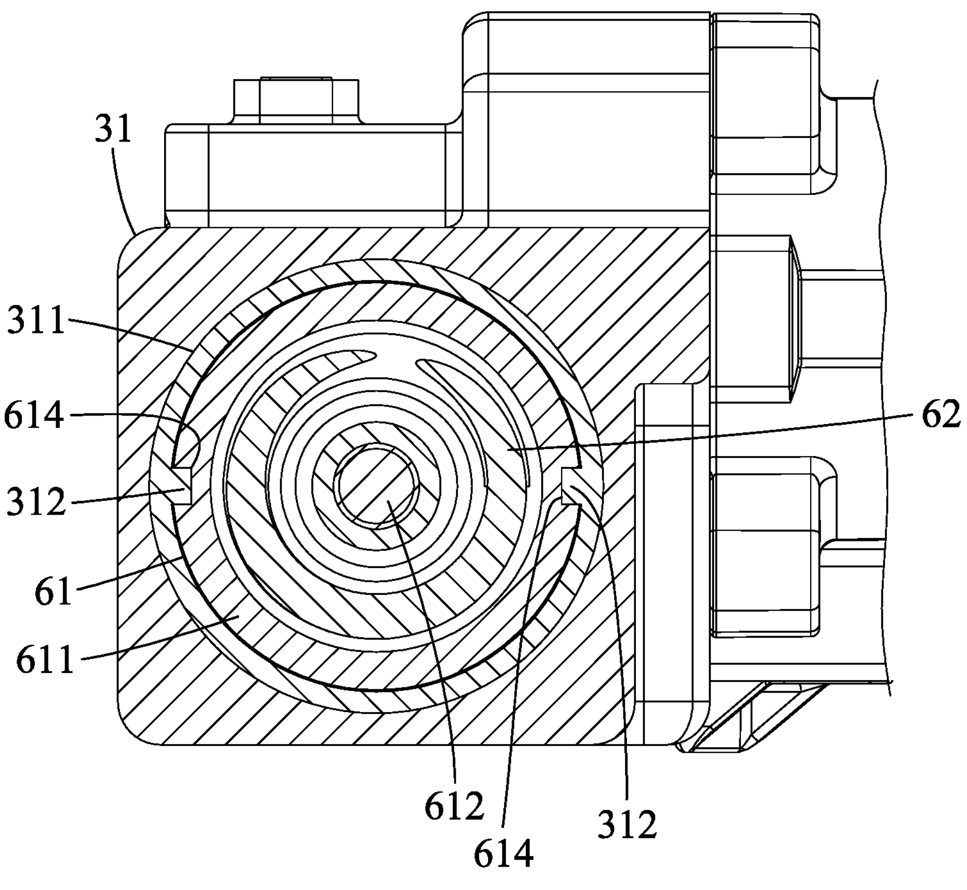
FIG. 11 is a fragmentary sectional view illustrating a modification of a main body of the embodiment and a modification of a sliding seat of the embodiment.

Referring further to FIG. 11, it is noted that in one embodiment, the main body 31 may further have two body-coupling portions 312 that are formed on the inner surface 311, and the sliding seat 611 may have two seat-coupling portions 614 that are formed on an outer surface thereof, and that are respectively and slidably engaged with the body-coupling portions 312 of the main body 31. In the one embodiment shown in FIG. 11, each of the body-coupling portions 312 is configured as a protrusion, and each of the seat-coupling portions 614 is configured as a recess. However, in another embodiment, each of the body-coupling portions 312 may be configured as a recess while each of the seat-coupling portions 614 may be configured as a protrusion. In still another embodiment, the body-coupling portions 312 may respectively be configured as a recess and a protrusion while the seat-coupling portions 614 may respectively be configured as a protrusion and a recess. By virtue of the seat-coupling portions 614 being respectively and slidably engaged with the body-coupling portions 312, the sliding seat 611 may slide on the inner surface 311 of the main body 31 more steadily.

In addition, the quantity of the pushing portions 711 of the lifting wheel 71 may not be limited to 4. In certain embodiments, the quantity of the pushing portions 711 may be any positive integer according to actual requirements.

The control subunit 83 may activate the motor module 72 even when the order in which the trigger signal (S1) and the activation signal (S2) are received by the control subunit 83 is reversed. That is to say, the motor module 72 may also be activated by the control subunit 83 even if the user places the muzzle 41 in the activation position before operating the trigger subunit 81. There will be no further description for the control subunits 83 and the signals since the relevant mechanism is widely-understood by those skilled in the art and various configurations are known.

Through the description above, the benefits of the embodiment are listed below.

By virtue of the lifting wheel 71 being operable to push the firing pin 612 to move in the energy storage direction (X2), and by virtue of the resilient member 62 constantly providing the hammer restoring force for the hammer member 61 to move in the striking direction (X1), the electric nail gun may repeatedly strike the nail 21 via a simple mechanism, and energy transmission path from the resilient member 62 to the nail 21 may be shortened, which reduces energy waste.

In addition, because the control unit 8 is capable of turning the motor module 72 off according to the location of the muzzle 41, the electric nail gun may stop striking the nail 21 when the nail 21 has been completely hammered into the object 22. Therefore, a user will not have to determine when he/she should stop operating the electric nail gun. The electric nail gun is user-friendly.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric nail gun comprising:

a main body unit defining an energy storage space and a passage that is in spatial communication with said energy storage space;

a muzzle unit including a muzzle that defines a nail-accommodating space, and a resilient member that is disposed in said passage, and that has two opposite ends respectively abutting against said muzzle and said main body unit, said nail-accommodating space being adapted for accommodating a nail, said muzzle extending into said passage, and being movable relative to said main body unit between an activation position, in which said muzzle is distal from said energy storage space, and a cessation position, in which said muzzle is proximate to said energy storage space, said resilient member constantly providing a muzzle restoring force for said muzzle to move away from the cessation position;

a hammer unit including a hammer member that extends from said energy storage space through said passage into said nail-accommodating space, that is movable relative to said energy storage space, said passage, and said nail-accommodating space, and that is adapted for striking the nail, and a resilient member that has two opposite ends respectively abutting against said hammer member and said main body unit, said resilient member of said hammer unit constantly providing a hammer restoring force for said hammer member to move in a striking direction for striking the nail;

a motor unit mounted to said main body unit, and including a lifting wheel that is rotatable about a rotation axis, and a motor module that is operable to urge said lifting wheel to rotate, said rotation axis being substantially orthogonal to the striking direction, said lifting wheel having at least one pushing portion that separably engages said hammer member, and that is operable to push said hammer member to move in an energy storage direction opposite to the striking direction such that said resilient member of said hammer unit is compressed and provides the hammer restoring force to said hammer member; and a control unit including a trigger subunit that is mounted to said main body unit, a sensing subunit that is mounted to said main body unit and said muzzle, and a control subunit that is signally coupled to said motor module, said sensing subunit and said trigger subunit, said trigger subunit generating a trigger signal when being operated, said sensing subunit generating an activation signal when said muzzle is in the activation position, said control subunit activating said motor module when receiving said trigger signal and said activation signal.

2. The electric nail gun as claimed in claim 1, wherein said main body unit includes a main body, and a sleeve that is connected to said main body and that surrounds a main axis to define said passage, said main body having an inner surface that defines said energy storage space, said muzzle being movable relative to said passage along the main axis, and surrounding the main axis to define said nail-accommodating space.

3. The electric nail gun as claimed in claim 2, wherein said hammer member includes a sliding seat that is slidable on said inner surface of said main body and that abuts against said resilient member of said hammer unit, and a firing pin that is connected to said sliding seat and that is adapted for striking the nail.

4. The electric nail gun as claimed in claim 3, wherein said main body further has a body-coupling portion that is formed on said inner surface, said sliding seat having a seat-coupling portion that is formed on an outer surface thereof and that is slidably engaged with said body-coupling portions.

5. The electric nail gun as claimed in claim 4, wherein one of said body-coupling portion and said seat-coupling portion is configured as a recess, and another one of said body-coupling portion and said seat-coupling portion is configured as a protrusion.

6. The electric nail gun as claimed in claim 3, wherein said firing pin has an abutting portion that is formed on one side thereof, said at least one pushing portion including a plurality of pushing portions that are equiangularly spaced apart from each other about the rotation axis and that are adjacent to an outer circumferential surface of said lifting wheel, said abutting portion of said hammer member being pushed by one of said pushing portions of said lifting wheel to move in the energy storage direction when said lifting wheel rotates.

7. The electric nail gun as claimed in claim 1, wherein said sensing subunit generates a stop signal when said muzzle is in the cessation position, and said control unit turns said motor module off when receiving said stop signal.

8. The electric nail gun as claimed in claim 7, wherein said sensing subunit includes a target member that is co-movably disposed on said muzzle, and two sensing members that are disposed on said main body unit, when said muzzle is in the activation position, said target member being located in a sensing area of one of said sensing members and the one of said sensing members generating said activation signal, when said muzzle is in the cessation position, said target member being located in a sensing area of another one of said sensing members and the another one of said sensing members generating said stop signal.

9. The electric nail gun as claimed in claim 8, wherein said main body unit includes a main body, and a sleeve that is connected to said main body, and that surrounds a main axis to define said passage, said target member being disposed on one end of said muzzle that faces said energy storage space, said sensing members being disposed on said sleeve and being spaced apart from each other along the main axis.

10. The electric nail gun as claimed in claim 8, wherein said muzzle has a nail outlet that is spaced apart from said passage and that is opposite to said target member, said nail outlet being adapted for the nail to exit said nail-accommodating space when said hammer member strikes the nail.

11. The electric nail gun as claimed in claim 10, further comprising a magazine unit, said muzzle further having a nail inlet that is in spatial communication with said nail-accommodating space, said magazine unit being co-movably connected to said muzzle, and being adapted for conveying the nail through said nail inlet into said nail-accommodating space.

12. The electric nail gun as claimed in claim 10, wherein said muzzle is movable relative to said main body unit among a standby position, in which a distance between said nail outlet and said energy storage space is longest, the activation position, in which a distance between said nail outlet and said energy storage space is shorter than the distance between said nail outlet and said energy storage space when said muzzle is in the standby position, and the cessation position, in which a distance between said nail outlet and said energy storage space is shorter than the distance between said nail outlet and said energy storage space when said muzzle is in the activation position, said resilient member of said muzzle unit constantly providing the muzzle restoring force for said muzzle to move away from the cessation position to the standby position.

* * * * *